United States Patent
Kim et al.

(10) Patent No.: US 10,796,434 B1
(45) Date of Patent: Oct. 6, 2020

(54) METHOD AND DEVICE FOR DETECTING PARKING AREA USING SEMANTIC SEGMENTATION IN AUTOMATIC PARKING SYSTEM

(71) Applicant: StradVision, Inc., Gyeongsangbuk-do (KR)

(72) Inventors: Kye-Hyeon Kim, Seoul (KR); Yongjoong Kim, Gyeongsangbuk-do (KR); Hak-Kyoung Kim, Gyeongsangbuk-do (KR); Woonhyun Nam, Gyeongsangbuk-do (KR); Sukhoon Boo, Gyeonggi-do (KR); Myungchul Sung, Gyeongsangbuk-do (KR); Dongsoo Shin, Gyeonggi-do (KR); Donghun Yeo, Gyeongsangbuk-do (KR); Wooju Ryu, Gyeongsangbuk-do (KR); Myeong-Chun Lee, Gyeongsangbuk-do (KR); Hyungsoo Lee, Seoul (KR); Taewoong Jang, Seoul (KR); Kyungjoong Jeong, Gyeongsangbuk-do (KR); Hongmo Je, Gyeongsangbuk-do (KR); Hojin Cho, Gyeongsangbuk-do (KR)

(73) Assignee: StradVision, Inc, Gyeongsangbuk-do (KR)

( * ) Notice: Subject to any disclaimer, the term of this patent is extended or adjusted under 35 U.S.C. 154(b) by 0 days.

(21) Appl. No.: 16/739,168

(22) Filed: Jan. 10, 2020

Related U.S. Application Data (60) Provisional application No. 62/799,349, filed on Jan. 31, 2019.

(51) Int. Cl.
*G06K 9/00* (2006.01)
*G06T 7/11* (2017.01)
(Continued)

(52) U.S. Cl.
CPC ............ *G06T 7/11* (2017.01); *B60R 11/04* (2013.01); *G06K 9/6263* (2013.01); *G06N 3/084* (2013.01);
(Continued)

(58) Field of Classification Search
CPC ............ G06T 7/11; G06T 2207/20081; G06T 2207/20084; G06T 2207/30264;
(Continued)

(56) References Cited

U.S. PATENT DOCUMENTS 9,046,364 B2 * 6/2015 Kojo ................. G01S 11/12
9,996,905 B2 * 6/2018 Rousmaniere ......... G01C 11/02
(Continued)

FOREIGN PATENT DOCUMENTS

| CN | 107665603 A | 2/2018 |
|---|---|---|
| CN | 107730903 A | 2/2018 |

OTHER PUBLICATIONS

Nurullayev, Sherzod, and Sang-Woong Lee. "Generalized parking occupancy analysis based on dilated convolutional neural network." Sensors 19.2 (2019): 277.
(Continued)

*Primary Examiner* — Shefali D Goradia
(74) *Attorney, Agent, or Firm* — Husch Blackwell LLP (57) ABSTRACT

A method for learning an automatic parking device of a vehicle for detecting an available parking area is provided. The method includes steps of: a learning device, (a) if a parking lot image of an area nearby the vehicle is acquired, (i) inputting the parking lot image into a segmentation network to output a convolution feature map via an encoder, output a deconvolution feature map by deconvoluting the convolution feature map via a decoder, and output segmentation information by masking the deconvolution feature map via a masking layer; (b) inputting the deconvolution
(Continued)

feature map into a regressor to generate relative coordinates of vertices of a specific available parking region, and generate regression location information by regressing the relative coordinates; and (c) instructing a loss layer to calculate 1-st losses by referring to the regression location information and an ROI GT, and learning the regressor via backpropagation using the 1-st losses.

24 Claims, 5 Drawing Sheets

(51) Int. Cl.
  *G08G 1/14* (2006.01)
  *G06K 9/62* (2006.01)
  *B60R 11/04* (2006.01)
  *G06N 3/08* (2006.01)
  *B62D 15/02* (2006.01)
  *B60Q 5/00* (2006.01)
  *B60Q 9/00* (2006.01)

(52) U.S. Cl.
  CPC .............. *G08G 1/143* (2013.01); *B60Q 5/005* (2013.01); *B60Q 9/002* (2013.01); *B62D 15/0285* (2013.01); *G06T 2207/20081* (2013.01); *G06T 2207/20084* (2013.01); *G06T 2207/30264* (2013.01)

(58) Field of Classification Search
  CPC ...... B60R 11/04; G06K 9/6263; G06N 3/084; G08G 1/143; B60Q 5/005; B60Q 9/002; B62D 15/0285
  See application file for complete search history.

(56) References Cited

U.S. PATENT DOCUMENTS

| | | | | |
|---|---|---|---|---|
| 10,268,908 | B2* | 4/2019 | Park | G06K 9/00805 |
| 10,343,433 | B2* | 7/2019 | Liu | B41J 13/0009 |
| 10,358,104 | B2* | 7/2019 | Chen | B60R 21/16 |
| 10,509,947 | B1* | 12/2019 | Douillard | G06T 3/0037 |
| 2006/0233461 | A1* | 10/2006 | Ma | G06K 9/00624 |
| | | | | 382/285 |
| 2008/0012938 | A1* | 1/2008 | Kubota | B60Q 9/008 |
| | | | | 348/118 |
| 2008/0036580 | A1* | 2/2008 | Breed | B60J 7/0573 |
| | | | | 340/438 |
| 2013/0182906 | A1* | 7/2013 | Kojo | G01S 11/12 |
| | | | | 382/103 |
| 2013/0258107 | A1 | 10/2013 | Delibaltov et al. | |
| 2016/0093214 | A1 | 3/2016 | Wu et al. | |
| 2018/0074494 | A1* | 3/2018 | Myers | H04W 4/029 |
| 2018/0131924 | A1* | 5/2018 | Jung | H04N 13/204 |
| 2018/0211117 | A1* | 7/2018 | Ratti | G06K 9/3233 |
| 2019/0257659 | A1* | 8/2019 | Moteki | G09B 29/00 |
| 2019/0294889 | A1* | 9/2019 | Sriram | G06K 9/6219 |

OTHER PUBLICATIONS

Islam, Md Amirul, et al. "Salient Object Detection using a Context-Aware Refinement Network." BMVC. 2017.

Janai, Joel, et al. "Computer vision for autonomous vehicles: Problems, datasets and state-of-the-art." arXiv preprint arXiv:1704.05519 (2017).

* cited by examiner

FIG. 5

METHOD AND DEVICE FOR DETECTING PARKING AREA USING SEMANTIC SEGMENTATION IN AUTOMATIC PARKING SYSTEM

CROSS REFERENCE TO RELATED APPLICATION

This application claims the benefit of priority to U.S. Provisional Patent Application No. 62/799,349, filed on Jan. 31, 2019, the entire contents of which are incorporated herein by reference.

FIELD OF THE DISCLOSURE

The present disclosure relates to an automatic parking device; and more particularly, to a method and a device for detecting unoccupied parking regions by the automatic parking system to be used for automatically parking a vehicle.

BACKGROUND OF THE DISCLOSURE

A vehicle refers to an apparatus that transports people, cargo, and the like from one place to another. Recently, a parking assist system has been developed and commercialized as a technological development for increasing the convenience of a user who drives the vehicle.

The parking assist system installed in a vehicle recognizes a parking space around the vehicle based on an around view monitoring (AVM) image to inform a driver of whether parking is possible and, when necessary, outputs a dangerous situation alarm to the driver using a sound signal or an optical signal. In some cases, the parking assist system is in charge of control of steering and speeding when parking.

To implement the parking assist system, at least one sensor for recognizing the parking space, such as a camera or an ultrasonic sensor, needs to be installed in the vehicle.

In order to recognize the parking space based on the AVM image, the parking assist system should detect a plurality of crossings included in the parking space as a preliminary process of parking space recognition.

The AVM image generally incurs a large error in a region corresponding to a location distant from a camera. To solve this problem, a scheme of detecting the crossings with respect to only regions corresponding to a predetermined range from the camera among all regions in the AVM image has been proposed. However, to do this, the vehicle should enter a region within a given distance of the parking space, which causes inconvenience in that the time required to recognize the parking space becomes large.

A parking space recognition apparatus based on an AVM image according to the prior art stores all location values for a detected crossing in sequentially generated image frames until a parking space is recognized. That is, the parking space recognition apparatus stores a plurality of location values with respect to one crossing and calculates an average of the location values, thereby detecting a final location of the crossing. In this case, an excessive amount of memory is used and the number of calculations for detecting a crossing increases.

That is, the conventional parking assist system simply indicates whether the parking space is occupied using sensors, measures distances of the parking space using microwave sensors, or detects parking lanes using edges in images, to thereby allow parking of the vehicle.

However, in such conventional methods, an automatic parking mode cannot be used simply with information on whether the parking space is occupied, and it is also difficult to secure the parking space with the microwave sensors only.

Also, a method using image processing is less useful due to a number of errors.

SUMMARY OF THE DISCLOSURE

It is an object of the present disclosure to solve all the aforementioned problems.

It is another object of the present disclosure to confirm one or more unoccupied parking regions in a parking lot.

It is still another object of the present disclosure to provide accurate information on the unoccupied parking regions in the parking lot.

In accordance with one aspect of the present disclosure, there is provided a method for learning an automatic parking device of a vehicle to be used for detecting an available parking area in a parking lot, including steps of: (a) if at least one parking lot image is acquired which is created by taking a shot of a nearby area of the vehicle from an upper part of the parking lot toward a ground of the parking lot, a learning device performing (i) a process of inputting the parking lot image into a segmentation network, to thereby allow the segmentation network to (i-1) output at least one convolution feature map by applying at least one convolution operation to the parking lot image via an encoder, (i-2) output at least one deconvolution feature map by applying at least one deconvolution operation to the convolution feature map via a decoder, and (i-3) output segmentation information, representing segmentation of one or more unoccupied parking regions on the parking lot image, by applying at least one masking operation to the deconvolution feature map via a masking layer; (b) the learning device performing (i) a process of inputting the deconvolution feature map, corresponding to a specific ROI, into a regressor to thereby allow the regressor (i-1) to generate relative coordinates of one or more vertices of the specific ROI from a center of the specific ROI, and thus (i-2) to generate regression location information on at least one specific available parking region by applying at least one regression operation to the relative coordinates, wherein the specific available parking region among the unoccupied parking regions is determined as the specific ROI; and (c) the learning device performing a process of instructing a 1-st loss layer to calculate one or more 1-st losses by referring to the regression location information and its corresponding at least one ROI GT, and a process of learning the regressor via backpropagation using the 1-st losses such that the 1-st losses are minimized.

As one example, the segmentation network has been pre-learned to output segmentation information created by segmenting the unoccupied parking regions on the parking lot image by a previous learning device, and wherein, if at least one previous parking lot image for training is acquired, the previous learning device performs (i) a process of inputting the previous parking lot image for training into the segmentation network, to thereby allow the segmentation network to (i-1) output at least one previous convolution feature map for training by applying at least one convolution operation to the previous parking lot image for training via the encoder, (i-2) output at least one previous deconvolution feature map for training by applying at least one deconvolution operation to the previous convolution feature map for training via the decoder, and (i-3) output previous segmentation information for training, representing segmentation of the unoccupied parking regions on the previous parking lot image for training, by applying at least one masking operation to the previous deconvolution feature map for training via the masking layer, and (ii) a process of instructing a 2-nd loss layer to calculate one or more 2-nd losses by referring to the previous segmentation information for training and its corresponding at least one segmentation GT, and updating at least one parameter of the masking layer, the decoder, and the encoder via backpropagation using the 2-nd losses such that the 2-nd losses are minimized.

As one example, the learning device performs a process of jittering the ROI GT, and a process of instructing the 1-st loss layer to calculate the 1-st losses by referring to the jittered ROI GT and the regression location information.

As one example, the learning device performs a process of setting a maximum and a minimum of scales of the ROI GT by referring to the scales of the ROI GT, and a process of jittering the ROI GT by using an average of the maximum and the minimum of the scales of the ROI GT.

As one example, the learning device performs a process of acquiring one or more random scales which are selected randomly from between the maximum and the minimum of the scales, and a process of instructing the 1-st loss layer to calculate one or more 3-rd losses by referring to each of the random scales and the regression location information, and fine-tune the regressor via backpropagation using each of the 3-rd losses such that each of the 3-rd losses is minimized.

As one example, the learning device performs a process of instructing the masking layer to apply at least one masking operation to the deconvolution feature map, to thereby segment at least one of (i) one or more available parking regions of interest, (ii) one or more background regions, (iii) one or more available parking regions of no interest, and (iv) one or more occupied parking regions, on the parking lot image.

As one example, the learning device performs a process of instructing the masking layer to segment the unoccupied parking regions into the available parking regions of interest and the available parking regions of no interest by referring to one or more distances between the unoccupied parking regions and the vehicle.

In accordance with another aspect of the present disclosure, there is provided a method for testing an automatic parking device of a vehicle to be used for detecting an available parking area in a parking lot, including steps of: (a) on condition that a learning device has performed, if at least one parking lot image for training is acquired, (i) a process of inputting the parking lot image for training into a segmentation network, to thereby allow the segmentation network to (i-1) output at least one convolution feature map for training by applying at least one convolution operation to the parking lot image for training via an encoder, (i-2) output at least one deconvolution feature map for training by applying at least one deconvolution operation to the convolution feature map for training via a decoder, and (i-3) output segmentation information for training, representing segmentation of one or more unoccupied parking regions for training on the parking lot image for training, by applying at least one masking operation to the deconvolution feature map for training via a masking layer, (ii) a process of inputting the deconvolution feature map for training, corresponding to a specific ROI for training, into a regressor to thereby allow the regressor (ii-1) to generate relative coordinates for training of one or more vertices of the specific ROI for training from a center of the specific ROI for training, and thus to (ii-2) generate regression location information for training on at least one specific available parking region for training by applying at least one regression operation to the relative coordinates for training, wherein the specific available parking region for training among the unoccupied parking regions for training is determined as the specific ROI for training, and (iii) a process of instructing a 1-st loss layer to calculate one or more 1-st losses by referring to the regression location information for training and its corresponding at least one ROI GT, and learning the regressor via backpropagation using the 1-st losses such that the 1-st losses are minimized, a testing device, if at least one parking lot image for testing is acquired which is created by taking a shot of a nearby area of a vehicle for testing from an upper part of a parking lot for testing toward a ground of the parking lot for testing, performing (a-1) a process of inputting the parking lot image for testing into the segmentation network, to thereby allow the segmentation network to (a-1-a) output at least one convolution feature map for testing by applying the convolution operation to the parking lot image for testing via the encoder, (a-1-b) output at least one deconvolution feature map for testing by applying the deconvolution operation to the convolution feature map for testing via the decoder, and (a-1-c) output segmentation information for testing, representing segmentation of one or more unoccupied parking regions for testing on the parking lot image for testing, by applying the masking operation to the deconvolution feature map for testing via the masking layer; and (b) the testing device performing (i) a process of inputting the deconvolution feature map for testing, corresponding to a specific ROI for testing, into the regressor, to thereby allow the regressor (i-1) to generate relative coordinates for testing of one or more vertices of the specific ROI for testing from a center of the specific ROI for testing, and thus (i-2) to generate regression location information for testing on at least one specific available parking region for testing by applying the regression operation to the relative coordinates for testing, wherein the specific available parking region for testing among the unoccupied parking regions for testing is determined as the specific ROI for testing.

As one example, the segmentation network has been pre-learned to output segmentation information for testing created by segmenting the unoccupied parking regions for testing on the parking lot image for testing by a previous learning device, and wherein, if at least one previous parking lot image for training is acquired, the previous learning device performs (i) a process of inputting the previous parking lot image for training into the segmentation network, to thereby allow the segmentation network to (i-1) output at least one previous convolution feature map for training by applying at least one convolution operation to the previous parking lot image for training via the encoder, (i-2) output at least one previous deconvolution feature map for training by applying at least one deconvolution operation to the previous convolution feature map for training via the decoder, and (i-3) output previous segmentation information for training, representing segmentation of the unoccupied parking regions on the previous parking lot image for training, by applying at least one masking operation to the previous deconvolution feature map for training via the masking layer, and (ii) a process of instructing a 2-nd loss layer to calculate one or more 2-nd losses by referring to the previous segmentation information for training and its corresponding at least one segmentation GT, and updating at least one parameter of the masking layer, the decoder, and the encoder via backpropagation using the 2-nd losses such that the 2-nd losses are minimized.

As one example, the testing device performs a process of instructing the masking layer to apply at least one masking operation to the deconvolution feature map for testing, to thereby segment at least one of (i) one or more available parking regions of interest for testing, (ii) one or more background regions for testing, (iii) one or more available parking regions of no interest for testing, and (iv) one or more occupied parking regions for testing, on the parking lot image for testing.

As one example, the testing device performs a process of instructing the masking layer to segment the unoccupied parking regions for testing into the available parking regions of interest for testing and the available parking regions of no interest for testing by referring to one or more distances between the unoccupied parking regions for testing and the vehicle for testing.

As one example, the method further comprises a step of: (c) if the regression location information for testing on the specific available parking region for testing is acquired, the testing device performing a process of instructing the automatic parking device of the vehicle for testing to park the vehicle for testing in the specific available parking region for testing by referring to the regression location information for testing.

In accordance with still another aspect of the present disclosure, there is provided a learning device for learning an automatic parking device of a vehicle to be used for detecting an available parking area in a parking lot, including: at least one memory that stores instructions; and at least one processor configured to execute the instructions to perform or support another device to perform: (I) if at least one parking lot image is acquired which is created by taking a shot of a nearby area of the vehicle from an upper part of the parking lot toward a ground of the parking lot, (i) a process of inputting the parking lot image into a segmentation network, to thereby allow the segmentation network to (i-1) output at least one convolution feature map by applying at least one convolution operation to the parking lot image via an encoder, (i-2) output at least one deconvolution feature map by applying at least one deconvolution operation to the convolution feature map via a decoder, and (i-3) output segmentation information, representing segmentation of one or more unoccupied parking regions on the parking lot image, by applying at least one masking operation to the deconvolution feature map via a masking layer, (II) a process of inputting the deconvolution feature map, corresponding to a specific ROI, into a regressor to thereby allow the regressor (i-1) to generate relative coordinates of one or more vertices of the specific ROI from a center of the specific ROI, and thus (i-2) to generate regression location information on at least one specific available parking region by applying at least one regression operation to the relative coordinates, wherein the specific available parking region among the unoccupied parking regions is determined as the specific ROI, and (III) a process of instructing a 1-st loss layer to calculate one or more 1-st losses by referring to the regression location information and its corresponding at least one ROI GT, and a process of learning the regressor via backpropagation using the 1-st losses such that the 1-st losses are minimized.

As one example, the segmentation network has been pre-learned to output segmentation information created by segmenting the unoccupied parking regions on the parking lot image by a previous learning device, and wherein, if at least one previous parking lot image for training is acquired, the previous learning device performs (i) a process of inputting the previous parking lot image for training into the segmentation network, to thereby allow the segmentation network to (i-1) output at least one previous convolution feature map for training by applying at least one convolution operation to the previous parking lot image for training via the encoder, (i-2) output at least one previous deconvolution feature map for training by applying at least one deconvolution operation to the previous convolution feature map for training via the decoder, and (i-3) output previous segmentation information for training, representing segmentation of the unoccupied parking regions on the previous parking lot image for training, by applying at least one masking operation to the previous deconvolution feature map for training via the masking layer, and (ii) a process of instructing a 2-nd loss layer to calculate one or more 2-nd losses by referring to the previous segmentation information for training and its corresponding at least one segmentation GT, and updating at least one parameter of the masking layer, the decoder, and the encoder via backpropagation using the 2-nd losses such that the 2-nd losses are minimized.

As one example, the processor performs a process of jittering the ROI GT, and a process of instructing the 1-st loss layer to calculate the 1-st losses by referring to the jittered ROI GT and the regression location information.

As one example, the processor performs a process of setting a maximum and a minimum of scales of the ROI GT by referring to the scales of the ROI GT, and a process of jittering the ROI GT by using an average of the maximum and the minimum of the scales of the ROI GT.

As one example, the processor performs a process of acquiring one or more random scales which are selected randomly from between the maximum and the minimum of the scales, and a process of instructing the 1-st loss layer to calculate one or more 3-rd losses by referring to each of the random scales and the regression location information, and fine-tune the regressor via backpropagation using each of the 3-rd losses such that each of the 3-rd losses is minimized.

As one example, the processor performs a process of instructing the masking layer to apply at least one masking operation to the deconvolution feature map, to thereby segment at least one of (i) one or more available parking regions of interest, (ii) one or more background regions, (iii) one or more available parking regions of no interest, and (iv) one or more occupied parking regions, on the parking lot image.

As one example, the processor performs a process of instructing the masking layer to segment the unoccupied parking regions into the available parking regions of interest and the available parking regions of no interest by referring to one or more distances between the unoccupied parking regions and the vehicle.

In accordance with still yet another aspect of the present disclosure, there is provided a testing device for testing an automatic parking device of a vehicle to be used for detecting an available parking area in a parking lot, including: at least one memory that stores instructions; and at least one processor configured to execute the instructions to perform or support another device to perform: (I) on condition that a learning device has performed, if at least one parking lot image for training is acquired, (i) a process of inputting the parking lot image for training into a segmentation network, to thereby allow the segmentation network to (i-1) output at least one convolution feature map for training by applying at least one convolution operation to the parking lot image for training via an encoder, (i-2) output at least one deconvolution feature map for training by applying at least one deconvolution operation to the convolution feature map for training via a decoder, and (i-3) output segmentation information for training, representing segmentation of one or more unoccupied parking regions for training on the parking lot image for training, by applying at least one masking operation to the deconvolution feature map for training via a masking layer, (ii) a process of inputting the deconvolution feature map for training, corresponding to a specific ROI for training, into a regressor to thereby allow the regressor (ii-1) to generate relative coordinates for training of one or more vertices of the specific ROI for training from a center of the specific ROI for training, and thus (ii-2) to generate regression location information for training on at least one specific available parking region for training by applying at least one regression operation to the relative coordinates for training, wherein the specific available parking region for training among the unoccupied parking regions for training is determined as the specific ROI for training, and (iii) a process of instructing a 1-st loss layer to calculate one or more 1-st losses by referring to the regression location information for training and its corresponding at least one ROI GT, and a process of learning the regressor via backpropagation using the 1-st losses such that the 1-st losses are minimized, (I-1) if at least one parking lot image for testing is acquired which is created by taking a shot of a nearby area of a vehicle for testing from an upper part of a parking lot for testing toward a ground of the parking lot for testing, a process of inputting the parking lot image for testing into the segmentation network, to thereby allow the segmentation network (I-1-a) to output at least one convolution feature map for testing by applying the convolution operation to the parking lot image for testing via the encoder, (I-1-b) output at least one deconvolution feature map for testing by applying the deconvolution operation to the convolution feature map for testing via the decoder, and (I-1-c) output segmentation information for testing, representing segmentation of one or more unoccupied parking regions for testing on the parking lot image for testing, by applying the masking operation to the deconvolution feature map for testing via the masking layer, and (II) a process of inputting the deconvolution feature map for testing, corresponding to a specific ROI for testing, into the regressor, to thereby allow the regressor (II-1) to generate relative coordinates for testing of one or more vertices of the specific ROI for testing from a center of the specific ROI for testing, and thus (II-2) to generate regression location information for testing on at least one specific available parking region for testing by applying the regression operation to the relative coordinates for testing, wherein the specific available parking region for testing among the unoccupied parking regions for testing is determined as the specific ROI for testing.

As one example, the segmentation network has been pre-learned to output segmentation information for testing created by segmenting the unoccupied parking regions for testing on the parking lot image for testing by a previous learning device, and wherein, if at least one previous parking lot image for training is acquired, the previous learning device performs (i) a process of inputting the previous parking lot image for training into the segmentation network, to thereby allow the segmentation network to (i-1) output at least one previous convolution feature map for training by applying at least one convolution operation to the previous parking lot image for training via the encoder, (i-2) output at least one previous deconvolution feature map for training by applying at least one deconvolution operation to the previous convolution feature map for training via the decoder, and (i-3) output previous segmentation information for training, representing segmentation of the unoccupied parking regions on the previous parking lot image for training, by applying at least one masking operation to the previous deconvolution feature map for training via the masking layer, and (ii) a process of instructing a 2-nd loss layer to calculate one or more 2-nd losses by referring to the previous segmentation information for training and its corresponding at least one segmentation GT, and updating at least one parameter of the masking layer, the decoder, and the encoder via backpropagation using the 2-nd losses such that the 2-nd losses are minimized.

As one example, the processor performs a process of instructing the masking layer to apply at least one masking operation to the deconvolution feature map for testing, to thereby segment at least one of (i) one or more available parking regions of interest for testing, (ii) one or more background regions for testing, (iii) one or more available parking regions of no interest for testing, and (iv) one or more occupied parking regions for testing, on the parking lot image for testing.

As one example, the processor performs a process of instructing the masking layer to segment the unoccupied parking regions for testing into the available parking regions of interest for testing and the available parking regions of no interest for testing by referring to one or more distances between the unoccupied parking regions for testing and the vehicle for testing.

As one example, the processor further performs: (III) if the regression location information for testing on the specific available parking region for testing is acquired, a process of instructing the automatic parking device of the vehicle for testing to park the vehicle for testing in the specific available parking region for testing by referring to the regression location information for testing.

In addition, recordable media readable by a computer for storing a computer program to execute the method of the present disclosure is further provided.

BRIEF DESCRIPTION OF THE DRAWINGS

The following drawings to be used to explain example embodiments of the present disclosure are only part of example embodiments of the present disclosure and other drawings can be obtained based on the drawings by those skilled in the art of the present disclosure without inventive work.

FIG. 5 is a drawing schematically illustrating a testing method for testing the automatic parking device of the

DETAILED DESCRIPTION OF THE PREFERRED EMBODIMENTS

Detailed explanation on the present disclosure to be made below refer to attached drawings and diagrams illustrated as specific embodiment examples under which the present disclosure may be implemented to make clear of purposes, technical solutions, and advantages of the present disclosure. These embodiments are described in sufficient detail to enable those skilled in the art to practice the invention.

Besides, in the detailed description and claims of the present disclosure, a term drawings and diagrams illustrated as specific embodiment ether technical features, additions, components or steps. Other objects, benefits and features of the present disclosure will be revealed to one skilled in the art, partially from the specification and partially from the implementation of the present disclosure. The following examples and drawings will be provided as examples but they are not intended to limit the present disclosure.

Moreover, the present disclosure covers all possible combinations of example embodiments indicated in this specification. It is to be understood that the various embodiments of the present disclosure, although different, are not necessarily mutually exclusive. For example, a particular feature, structure, or characteristic described herein in connection with one embodiment may be implemented within other embodiments without departing from the spirit and scope of the present disclosure. In addition, it is to be understood that the position or arrangement of individual elements within each disclosed embodiment may be modified without departing from the spirit and scope of the present disclosure. The following detailed description is, therefore, not to be taken in a limiting sense, and the scope of the present disclosure is defined only by the appended claims, appropriately interpreted, along with the full range of equivalents to which the claims are entitled. In the drawings, similar reference numerals refer to the same or similar functionality throughout the several aspects.

Any images referred to in the present disclosure may include images related to any roads paved or unpaved, in which case the objects on the roads or near the roads may include vehicles, persons, animals, plants, buildings, flying objects like planes or drones, or any other obstacles which may appear in a road-related scene, but the scope of the present disclosure is not limited thereto. As another example, said any images referred to in the present disclosure may include images not related to any roads, such as images related to alleyway, land lots, sea, lakes, rivers, mountains, forests, deserts, sky, or any indoor space, in which case the objects in said any images may include vehicles, persons, animals, plants, buildings, flying objects like planes or drones, ships, amphibious planes or ships, or any other obstacles which may appear in a scene related to alleyway, land lots, sea, lakes, rivers, mountains, forests, deserts, sky, or any indoor space, but the scope of the present disclosure is not limited thereto.

The headings and abstract of the present disclosure provided herein are for convenience only and do not limit or interpret the scope or meaning of the embodiments.

As used in this specification and the appended claims, the singular forms "a," "an," and "the" include plural referents unless the content and context clearly dictates otherwise.

For reference, in the description below, the phrase "for training" or "training" is added for terms related to the learning process, and the phrase "for testing" or "testing" is added for terms related to the testing process, to avoid possible confusion.

To allow those skilled in the art to carry out the present disclosure easily, the example embodiments of the present disclosure by referring to attached diagrams will be explained in detail as shown below.

Figure 1:
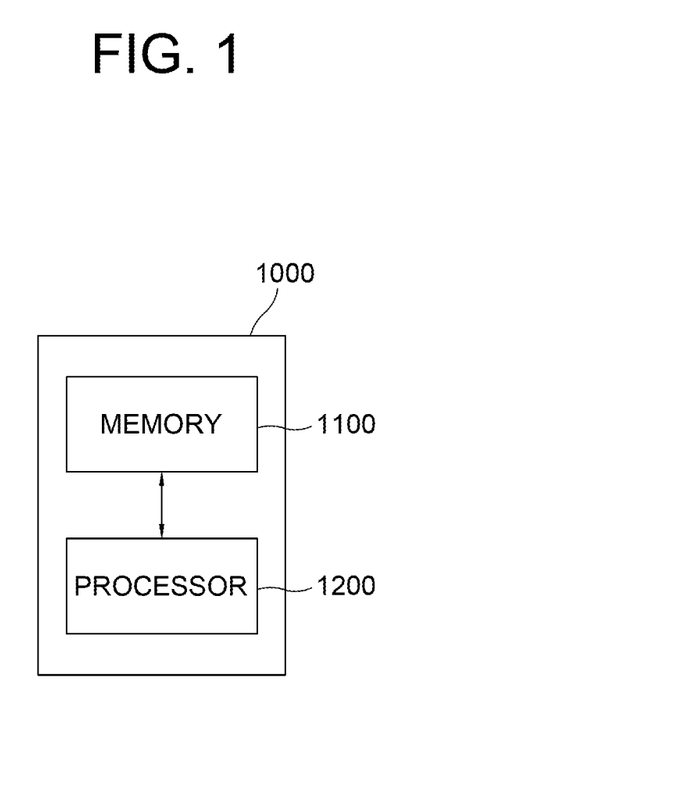
FIG. 1 is a drawing schematically illustrating a learning device for learning an automatic parking device of a vehicle to be used for detecting parking regions in a parking lot in accordance with one example embodiment of the present disclosure.

FIG. 1 is a drawing schematically illustrating a learning device for learning an automatic parking device of a vehicle to be used for detecting one or more parking regions in a parking lot, in accordance with one example embodiment of the present disclosure. By referring to FIG. 1, the learning device 1000 may include a memory 1100 for storing instructions to learn the automatic parking device of the vehicle to be used for detecting the parking regions in the parking lot, and a processor 1200 for performing processes according to the instructions in the memory 110 to learn the automatic parking device of the vehicle to be used for detecting the parking regions in the parking lot.

Specifically, the learning device 1000 may typically achieve a desired system performance by using combinations of at least one computing device and at least one computer software, e.g., a computer processor, a memory, a storage, an input device, an output device, or any other conventional computing components, an electronic communication device such as a router or a switch, an electronic information storage system such as a network-attached storage (NAS) device and a storage area network (SAN) as the computing device and any instructions that allow the computing device to function in a specific way as the computer software.

The processor of the computing device may include hardware configuration of MPU (Micro Processing Unit) or CPU (Central Processing Unit), cache memory, data bus, etc. Additionally, the computing device may further include OS and software configuration of applications that achieve specific purposes.

However, such description of the computing device does not exclude an integrated device including any combination of a processor, a memory, a medium, or any other computing components for implementing the present disclosure.

A method for learning the automatic parking device of the vehicle to be used for detecting the parking regions in the parking lot by using the learning device 1000 in accordance with one example embodiment of the present disclosure is described by referring to FIG. 2 as follows.

First, if at least one parking lot image to be used for training is acquired, which is created by taking a shot of a nearby area of the vehicle from an upper part of the parking lot toward a ground of the parking lot, the learning device 1000 may perform a process of inputting the parking lot image into a segmentation network 100, to thereby allow the segmentation network 100 to output segmentation information, representing segmentation of one or more unoccupied parking regions on the parking lot image.

For example, the segmentation network 100 may output at least one convolution feature map by applying at least one convolution operation to the parking lot image via an encoder 110, and may output at least one deconvolution feature map by applying at least one deconvolution operation to the convolution feature map via a decoder 120.

Herein, the encoder 110 may down-sample the parking lot image and the decoder 120 may up-sample a down-sampled feature map.

And, the encoder 110 may include one or more convolutional layers capable of reducing a size of a feature map or an image by applying one or more convolution operations to the parking lot image, and the decoder 120 may include one or more deconvolutional layers capable of increasing a size of a feature map by applying one or more deconvolution operations to the feature map whose size has been reduced by the convolution operations. Herein, a feature map outputted from the decoder 120 may be referred to as a last feature map.

Also, the segmentation network 100 may include at least part of an FCN (Fully Convolution Network), DeepLab v1, v2, U-Net, ReSeg, etc.

Thereafter, the segmentation network 100 may instruct a masking layer 130 to generate semantic segmentation which is a result of classifying the last feature map, i.e., the deconvolution feature map, into each of the segmentation classes.

Herein, the masking layer 130 may include at least one binary masking layer whose binary value may be set as different for each of the segmentation classes.

And, the segmentation classes may be set as one or more available parking regions of interest, one or more background regions, one or more available parking regions of no interest, and one or more occupied parking regions, but the scope of the present disclosure is not limited thereto, and may be set as various classes that can be used for grouping the parking regions in the parking lot according to a condition of the parking lot.

Also, the learning device 1000 may perform a process of instructing the masking layer 130 to segment the unoccupied parking regions into the available parking regions of interest and the available parking regions of no interest by referring to one or more distances between the unoccupied parking regions and the vehicle.

Next, the learning device 1000 may perform a process of inputting the deconvolution feature map, corresponding to a specific ROI (Region Of Interest), into a regressor 200 to thereby allow the regressor 200 to generate relative coordinates of one or more vertices of the specific ROI from a center of the specific ROI, and thus to generate regression location information on at least one specific available parking region by applying at least one regression operation to the relative coordinates, where the specific available parking region among the unoccupied parking regions is determined as the specific ROI.

Next, the learning device 1000 may perform a process of instructing a 1-st loss layer 300 to calculate one or more 1-st losses by referring to the regression location information and its corresponding at least one ROI GT (Ground Truth), and a process of learning the regressor 200 via backpropagation using the 1-st losses such that the 1-st losses are minimized.

Herein, the learning device 1000 performs a process of learning the regressor 200 by using the ROI GT corresponding to the specific ROI which is the specific available parking region, however, the unoccupied parking regions inferred to at a testing process may not be accurate as the ROI according to the GT, thus relative coordinates acquired by the regressor 200 may have an error.

Therefore, the regressor 200 with robustness capable of acquiring accurate relative coordinates even with an erratic ROI by learning the regressor 200 with the arbitrarily jittered ROI GT may be provided.

That is, the learning device 1000 may perform a process of jittering the ROI GT, and a process of instructing the 1-st loss layer 300 to calculate the 1-st losses by referring to the jittered ROI GT and the regression location information.

Herein, the GT of the relative coordinates acquired by the regressor 200 may vary according to jittered parts.

And, the learning device 1000 may perform a process of setting a maximum and a minimum of scales of the ROI GT by referring to the scales of the ROI GT, and a process of jittering the ROI GT by using an average of the maximum and the minimum of the scales of the ROI GT.

As one example, supposing that the scale of the ROI is S, Smax may be set as maximum of the scale, Smin may be set as the minimum of the scale, and the scale S of the ROI may be set as an average S=(Smax+Smin)/2 of the maximum and the minimum of the scales, and then the regressor 200 may be learned using the scale S.

And, the learning device 1000 may perform a process of acquiring one or more random scales by selecting randomly from between the maximum and the minimum of the scales, and a process of instructing the 1-st loss layer 300 to calculate one or more 3-rd losses by referring to each of the random scales and the regression location information, and fine-tune the regressor 200 via backpropagation using each of the 3-rd losses such that each of the 3-rd losses is minimized.

As a result, at the testing process, (i) the ROI of each of the available parking regions of interest may be extracted from semantic segmentation information, (ii) one or more features of the ROI may be inputted into the regressor 200, (iii) the relative coordinates may be acquired from the regressor 200, and then (iv) the accurate coordinates of four vertices of said each of the available parking regions of interest may be acquired based on a center of the extracted ROI.

Meanwhile, the segmentation network 100 may have been pre-learned to output segmentation information created by segmenting the available parking regions of interest on the parking lot image by a previous learning device. Herein, the previous learning device may include a memory for storing instructions to learn the segmentation network 100, and a processor for performing processes of learning the segmentation network 100 according to the instructions in the memory. And, the previous learning device may achieve a desired system performance by typically using a combination of at least one computing device and at least one computer software, as the learning device described in FIG. 1, and detailed description is omitted.

As one example, by referring to FIG. 3, a process of pre-learning the segmentation network 100 is described as follows.

First, if at least one previous parking lot image for training is acquired, the previous learning device 1500 may perform a process of inputting the previous parking lot image for training into the segmentation network 100.

Then, the segmentation network 100 may output at least one previous convolution feature map for training by applying at least one convolution operation to the previous parking lot image for training via the encoder 110, and may output at least one previous deconvolution feature map for training by applying at least one deconvolution operation to the previous convolution feature map for training via the decoder 120.

And, the segmentation network 100 may instruct the masking layer 130 to apply at least one masking operation to the previous deconvolution feature map for training, to thereby output previous segmentation information for training by segmenting the available parking regions of interest on the previous parking lot image for training.

Thereafter, the previous learning device 1500 may perform a process of instructing a 2-nd loss layer 500 to calculate one or more 2-nd losses by referring to the previous segmentation information for training and its corresponding at least one segmentation GT, and updating at least one parameter of the masking layer, the decoder, and the encoder via backpropagation using the 2-nd losses such that the 2-nd losses are minimized, to thereby pre-learn the segmentation network 100.

Figure 4:
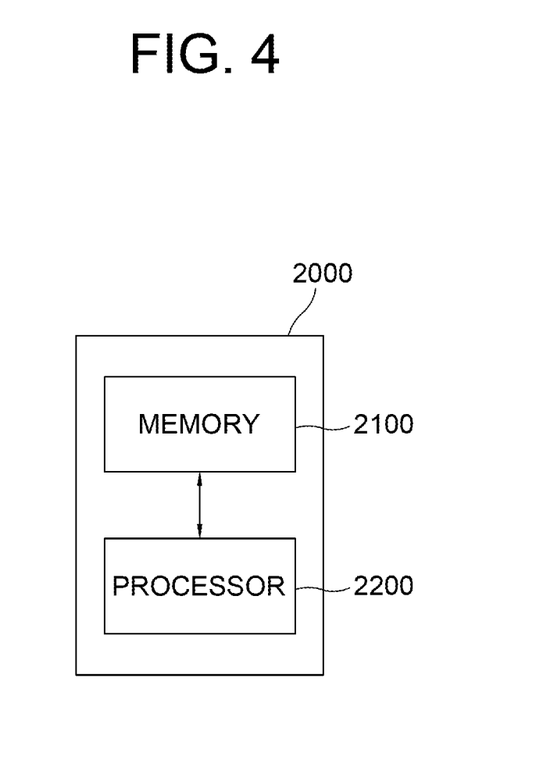
FIG. 4 is a drawing schematically illustrating a testing device for testing the automatic parking device of the vehicle to be used for detecting the parking regions in the parking lot in accordance with one example embodiment of the present disclosure.

FIG. 4 is a drawing schematically illustrating a testing device for testing the automatic parking device of the vehicle to be used for detecting the parking regions in the parking lot, in accordance with one example embodiment of the present disclosure. By referring to FIG. 4, the testing device 2000 may include a memory 2100 for storing instructions to test the automatic parking device of the vehicle to be used for detecting the parking regions in the parking lot, and a processor 2200 for performing processes according to the instructions in the memory 2100 to test the automatic parking device of the vehicle to be used for detecting the parking regions in the parking lot.

Specifically, the testing device 2000 may typically achieve a desired system performance by using combinations of at least one computing device and at least one computer software, e.g., a computer processor, a memory, a storage, an input device, an output device, or any other conventional computing components, an electronic communication device such as a router or a switch, an electronic information storage system such as a network-attached storage (NAS) device and a storage area network (SAN) as the computing device and any instructions that allow the computing device to function in a specific way as the computer software.

The processor of the computing device may include hardware configuration of MPU (Micro Processing Unit) or CPU (Central Processing Unit), cache memory, data bus, etc. Additionally, the computing device may further include OS and software configuration of applications that achieve specific purposes.

However, such description of the computing device does not exclude an integrated device including any combination of a processor, a memory, a medium, or any other computing components for implementing the present disclosure.

Figure 5:
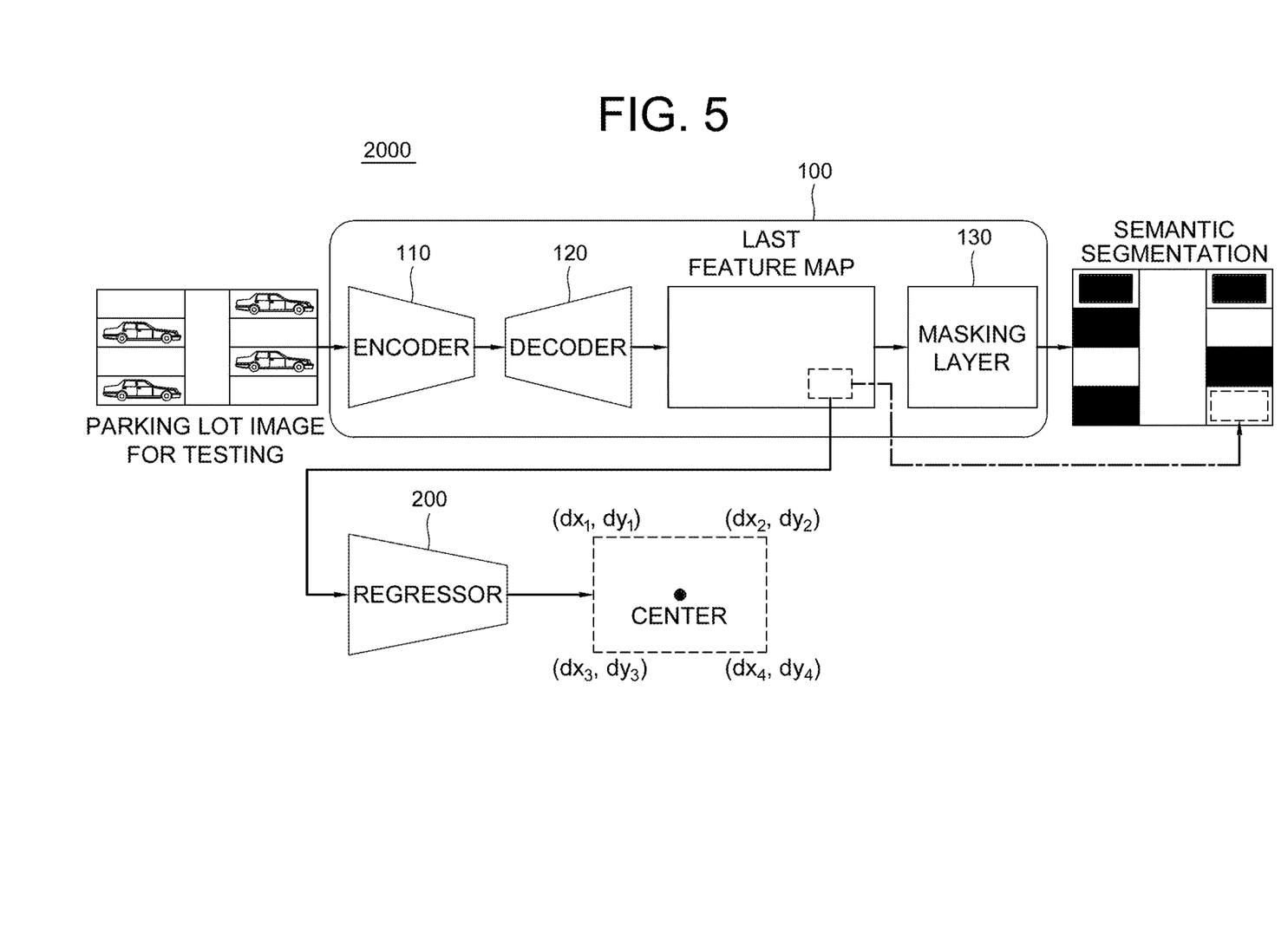

A method for testing the automatic parking device of the vehicle to be used for detecting the parking regions in the parking lot by using the testing device 2000 in accordance with one example embodiment of the present disclosure is described by referring to FIG. 5 as follows.

Figure 2:
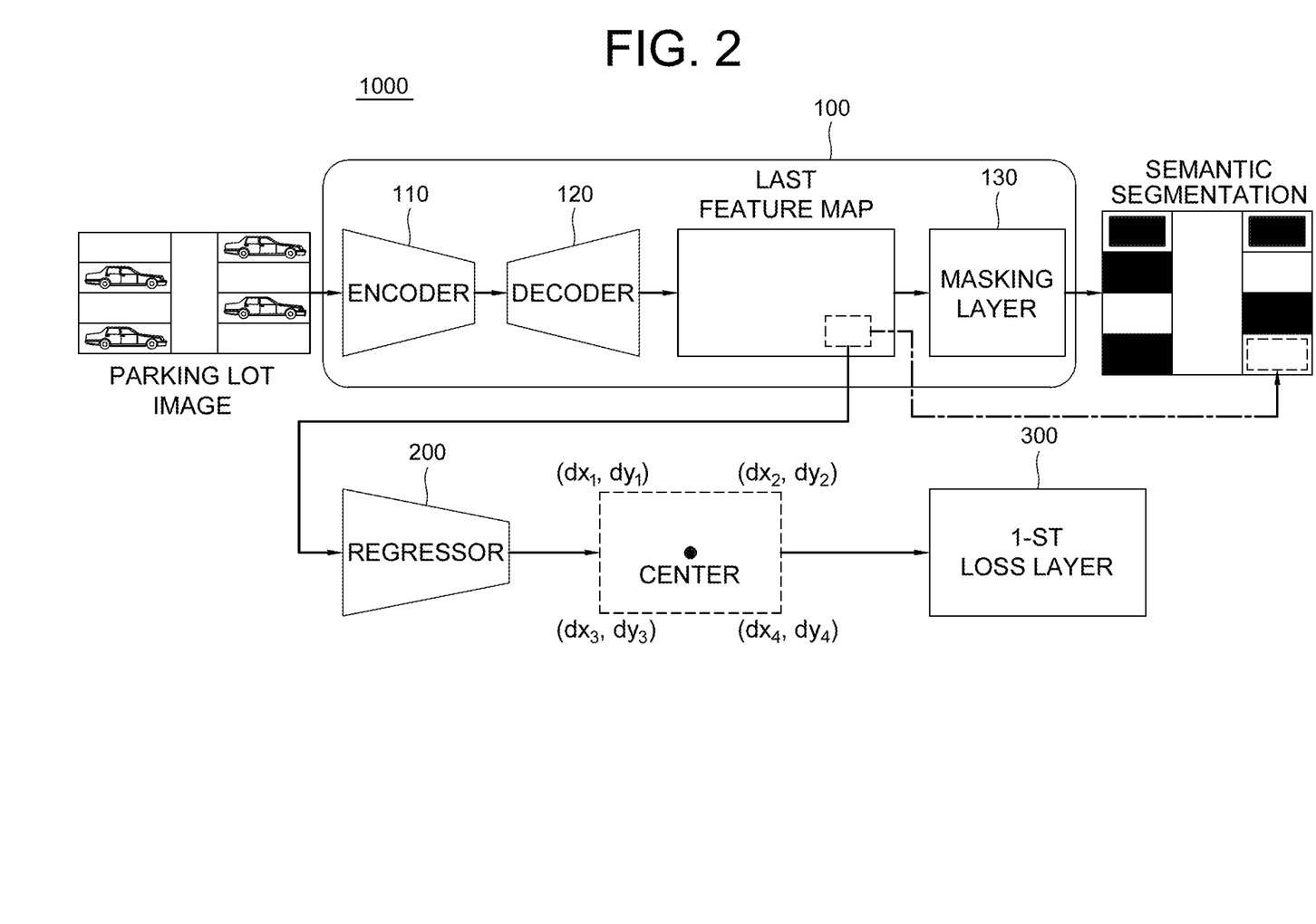
FIG. 2 is a drawing schematically illustrating a learning method for learning the automatic parking device of the vehicle to be used for detecting the parking regions in the parking lot in accordance with one example embodiment of the present disclosure.
Figure 3:
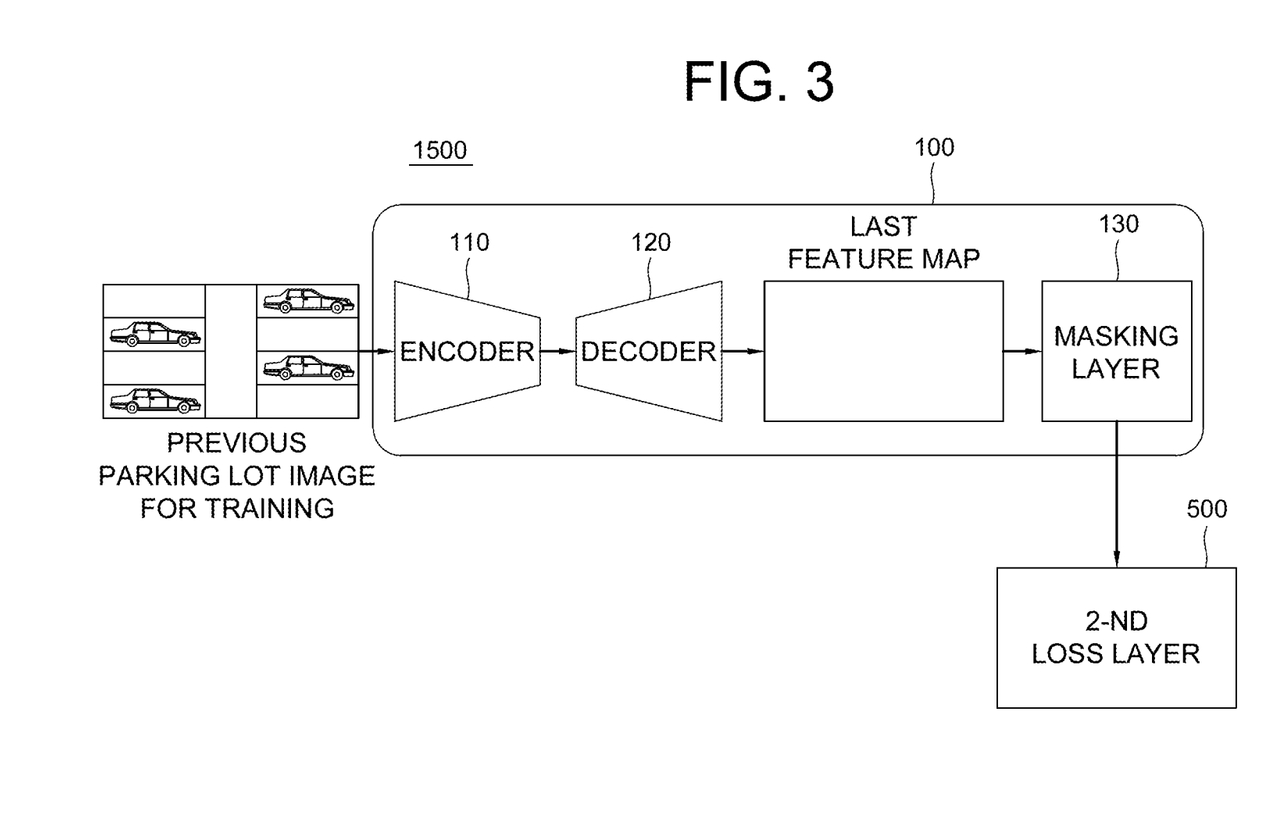
FIG. 3 is a drawing schematically illustrating a method for pre-learning a segmentation network to be used for segmenting the parking regions in the learning method for learning the automatic parking device of the vehicle to be used for detecting the parking regions in the parking lot in accordance with one example embodiment of the present disclosure.

First, the segmentation network 100 and the regressor 200 may have been learned according to the learning method described by referring to FIGS. 2 and 3.

That is, if at least one parking lot image for training is acquired, the learning device may perform (i) a process of inputting the parking lot image for training into the segmentation network 100, to thereby allow the segmentation network 100 to output at least one convolution feature map for training by applying at least one convolution operation to the parking lot image for training via the encoder 110, output at least one deconvolution feature map for training by applying at least one deconvolution operation to the convolution feature map for training via the decoder 120, and output segmentation information for training, representing segmentation of one or more unoccupied parking regions for training on the parking lot image for training, by applying at least one masking operation to the deconvolution feature map for training via the masking layer 130. And, the learning device may perform a process of inputting the deconvolution feature map for training, corresponding to a specific ROI for training, into the regressor 200 to thereby allow the regressor 200 to generate relative coordinates for training of one or more vertices of the specific ROI for training from a center of the specific ROI for training, and thus to generate regression location information for training on at least one specific available parking region for training by applying at least one regression operation to the relative coordinates for training, where the specific available parking region for training among the unoccupied parking regions for training is determined as the specific ROI for training. And, the learning device may perform a process of instructing the 1-st loss layer to calculate the 1-st losses by referring to the regression location information for training and its corresponding at least one ROI GT, and a process of learning the regressor 200 via backpropagation using the 1-st losses such that the 1-st losses are minimized.

Also, the segmentation network 100 may have been pre-learned to output segmentation information for testing created by segmenting the available parking regions of interest for testing on the parking lot image for testing by the previous learning device.

That is, if at least one previous parking lot image for training is acquired, the previous learning device may perform (i) a process of inputting the previous parking lot image for training into the segmentation network 100, to thereby allow the segmentation network 100 to output at least one previous convolution feature map for training by applying at least one convolution operation to the previous parking lot image for training via the encoder 110, output at least one previous deconvolution feature map for training by applying at least one deconvolution operation to the previous convolution feature map for training via the decoder 120, and output previous segmentation information for training, representing segmentation of the unoccupied parking regions for training on the previous parking lot image for training, by applying at least one masking operation to the previous deconvolution feature map for training via the masking layer 130. And, the previous learning device may perform a process of instructing the 2-nd loss layer to calculate the 2-nd losses by referring to the previous segmentation information for training and its corresponding at least one segmentation GT, and updating at least one parameter of the masking layer 130, the decoder 120, and the encoder 110 via backpropagation using the 2-nd losses such that the 2-nd losses are minimized, to thereby pre-learn the segmentation network 100.

On condition that the segmentation network 100 and the regressor 200 have been learned as such, if at least one parking lot image for testing is acquired which is created by taking a shot of a nearby area of a vehicle for testing from an upper part of a parking lot for testing toward a ground of the parking lot for testing, the testing device 2000 may perform a process of inputting the parking lot image for testing into the segmentation network 100.

Herein, the parking lot image for testing may be an image taken by at least one camera mounted on the upper part, e.g., a ceiling or a wall, of the parking lot for testing, shooting toward the ground of the parking lot for testing.

Then, the segmentation network 100 may output at least one convolution feature map for testing by applying the convolution operation to the parking lot image for testing via the encoder 110, output at least one deconvolution feature map for testing by applying the deconvolution operation to the convolution feature map for testing via the decoder 120, and output segmentation information for testing, representing segmentation of one or more unoccupied parking regions for testing on the parking lot image for testing, by applying the masking operation to the deconvolution feature map for testing via the masking layer 130.

Herein, the segmentation network 100 may perform a process of instructing the masking layer 130 to apply the masking operation to the deconvolution feature map for testing, to thereby segment at least one of (i) one or more available parking regions of interest for testing, (ii) one or more background regions for testing, (iii) one or more available parking regions of no interest for testing, and (iv) one or more occupied parking regions for testing, on the parking lot image for testing. In detail, the segmentation network 100 may instruct the masking layer 130 to segment the unoccupied parking regions for testing into the available parking regions of interest for testing and the available parking regions of no interest for testing by referring to one or more distances between the unoccupied parking regions for testing and the vehicle for testing.

And, a driver of the vehicle for testing may select a desired one of the available parking regions of interest among the displayed semantic segmentation.

Also, as another example, the automatic parking device of the vehicle may select the specific available parking region among the available parking regions of interest by referring to a specific condition. For example, the specific available parking region that is closest to a current location of the vehicle among the available parking regions of interest may be selected, or the specific available parking region located at a minimum travel distance in a traveling direction of the vehicle may be selected.

Then, the testing device 2000 may perform a process of inputting the deconvolution feature map for testing, corresponding to a specific ROI for testing, into the regressor 200 to thereby allow the regressor 200 to generate relative coordinates for testing of one or more vertices of the specific ROI for testing from a center of the specific ROI for testing, and thus to generate regression location information for testing on at least one specific available parking region for testing by applying the regression operation to the relative coordinates for testing, where the specific available parking region for testing among the unoccupied parking regions of interest for testing is determined as the specific ROI for testing.

And, if the regression location information for testing on the specific available parking region for testing is acquired, the testing device 2000 may perform a process of instructing the automatic parking device of the vehicle for testing to park the vehicle for testing in the specific available parking region for testing by referring to the regression location information for testing.

That is, by providing accurate location information on the unoccupied parking regions as well as confirming the unoccupied parking regions in the parking lot, the automatic parking device of the vehicle may be allowed to park the vehicle in one of the unoccupied parking regions.

Meanwhile, multiple cameras may be installed such that each of the cameras takes videos or images of equally divided areas of the parking lot, and each of the cameras may have its appointed location in the parking lot.

As described above, the present disclosure confirms the unoccupied parking regions by applying the semantic segmentation to the parking lot image taken from the upper part of the parking lot toward the ground, and provides accurate information on the available parking regions of interest by calculating the relative coordinates of the vertices of the available parking regions of interest via the regressor learned by jittering the ROIs corresponding to the available parking regions of interest in the semantic segmentation.

The present disclosure has an effect of supporting the automatic parking mode of the vehicle since the unoccupied parking regions in the parking lot can be determined.

The present disclosure has another effect of improving convenience of a user of the parking lot since the unoccupied parking regions in the parking lot can be determined.

The present disclosure has still another effect of allowing the user to park the vehicle quickly in the parking lot by providing the accurate information on the unoccupied parking regions in the parking lot.

The present disclosure has still yet another effect of improving performance of an automatic parking system by providing the information on the unoccupied parking regions in the parking lot.

The present disclosure has still yet another effect of automating the parking lot by eliminating a need for parking staffs.

The embodiments of the present disclosure as explained above can be implemented in a form of executable program command through a variety of computer means recordable to computer readable media. The computer readable media may include solely or in combination, program commands, data files, and data structures. The program commands recorded to the media may be components specially designed for the present disclosure or may be usable to those skilled in the art. Computer readable media include magnetic media such as hard disk, floppy disk, and magnetic tape, optical media such as CD-ROM and DVD, magneto-optical media such as floptical disk and hardware devices such as ROM, RAM, and flash memory specially designed to store and carry out program commands. Program commands include not only a machine language code made by a complier but also a high level code that can be used by an interpreter etc., which is executed by a computer. The aforementioned hardware device can work as more than a software module to perform the action of the present disclosure and vice versa.

As seen above, the present disclosure has been explained by specific matters such as detailed components, limited embodiments, and drawings. They have been provided only to help more general understanding of the present disclosure. It, however, will be understood by those skilled in the art that various changes and modification may be made from the description without departing from the spirit and scope of the disclosure as defined in the following claims.

Accordingly, the thought of the present disclosure must not be confined to the explained embodiments, and the following patent claims as well as everything including variations equal or equivalent to the patent claims pertain to the category of the thought of the present disclosure.

What is claimed is:

1. A method for learning an automatic parking device of a vehicle to be used for detecting an available parking area in a parking lot, comprising steps of:

(a) if at least one parking lot image is acquired which is created by taking a shot of a nearby area of the vehicle from an upper part of the parking lot toward a ground of the parking lot, a learning device performing (i) a process of inputting the parking lot image into a segmentation network, to thereby allow the segmentation network to (i-1) output at least one convolution feature map by applying at least one convolution operation to the parking lot image via an encoder, (i-2) output at least one deconvolution feature map by applying at least one deconvolution operation to the convolution feature map via a decoder, and (i-3) output segmentation information, representing segmentation of one or more unoccupied parking regions on the parking lot image, by applying at least one masking operation to the deconvolution feature map via a masking layer;

(b) the learning device performing (i) a process of inputting the deconvolution feature map, corresponding to a specific Region of Interest (ROI), into a regressor to thereby allow the regressor (i-1) to generate relative coordinates of one or more vertices of the specific ROI from a center of the specific ROI, and thus (i-2) to generate regression location information on at least one specific available parking region by applying at least one regression operation to the relative coordinates, wherein the specific available parking region among the unoccupied parking regions is determined as the specific ROI; and (c) the learning device performing a process of instructing a 1-st loss layer to calculate one or more 1-st losses by referring to the regression location information and its corresponding at least one ROI Ground-Truth (GT), and a process of learning the regressor via backpropagation using the 1-st losses such that the 1-st losses are minimized.

2. The method of claim 1, wherein the segmentation network has been pre-learned to output segmentation information created by segmenting the unoccupied parking regions on the parking lot image by a previous learning device, and
wherein, if at least one previous parking lot image for training is acquired, the previous learning device performs (i) a process of inputting the previous parking lot image for training into the segmentation network, to thereby allow the segmentation network to (i-1) output at least one previous convolution feature map for training by applying at least one convolution operation to the previous parking lot image for training via the encoder, (i-2) output at least one previous deconvolution feature map for training by applying at least one deconvolution operation to the previous convolution feature map for training via the decoder, and (i-3) output previous segmentation information for training, representing segmentation of the unoccupied parking regions on the previous parking lot image for training, by applying at least one masking operation to the previous deconvolution feature map for training via the masking layer, and (ii) a process of instructing a 2-nd loss layer to calculate one or more 2-nd losses by referring to the previous segmentation information for training and its corresponding at least one segmentation GT, and updating at least one parameter of the masking layer, the decoder, and the encoder via backpropagation using the 2-nd losses such that the 2-nd losses are minimized.

3. The method of claim 1, wherein the learning device performs a process of jittering the ROI GT, and a process of instructing the 1-st loss layer to calculate the 1-st losses by referring to the jittered ROI GT and the regression location information.

4. The method of claim 3, wherein the learning device performs a process of setting a maximum and a minimum of scales of the ROI GT by referring to the scales of the ROI GT, and a process of jittering the ROI GT by using an average of the maximum and the minimum of the scales of the ROI GT.

5. The method of claim 4, wherein the learning device performs a process of acquiring one or more random scales which are selected randomly from between the maximum and the minimum of the scales, and a process of instructing the 1-st loss layer to calculate one or more 3-rd losses by referring to each of the random scales and the regression location information, and fine-tune the regressor via backpropagation using each of the 3-rd losses such that each of the 3-rd losses is minimized.

6. The method of claim 1, wherein the learning device performs a process of instructing the masking layer to apply at least one masking operation to the deconvolution feature map, to thereby segment at least one of (i) one or more available parking regions of interest, (ii) one or more background regions, (iii) one or more available parking regions of no interest, and (iv) one or more occupied parking regions, on the parking lot image.

7. The method of claim 6, wherein the learning device performs a process of instructing the masking layer to segment the unoccupied parking regions into the available parking regions of interest and the available parking regions of no interest by referring to one or more distances between the unoccupied parking regions and the vehicle.

8. A method for testing an automatic parking device of a vehicle to be used for detecting an available parking area in a parking lot, comprising steps of:

(a) on condition that a learning device has performed, if at least one parking lot image for training is acquired, (i) a process of inputting the parking lot image for training into a segmentation network, to thereby allow the segmentation network to (i-1) output at least one convolution feature map for training by applying at least one convolution operation to the parking lot image for training via an encoder, (i-2) output at least one deconvolution feature map for training by applying at least one deconvolution operation to the convolution feature map for training via a decoder, and (i-3) output segmentation information for training, representing segmentation of one or more unoccupied parking regions for training on the parking lot image for training, by applying at least one masking operation to the deconvolution feature map for training via a masking layer, (ii) a process of inputting the deconvolution feature map for training, corresponding to a specific Region of Interests (ROI) for training, into a regressor to thereby allow the regressor (ii-1) to generate relative coordinates for training of one or more vertices of the specific ROI for training from a center of the specific ROI for training, and thus (ii-2) to generate regression location information for training on at least one specific available parking region for training by applying at least one regression operation to the relative coordinates for training, wherein the specific available parking region for training among the unoccupied parking regions for training is determined as the specific ROI for training, and (iii) a process of instructing a 1-st loss layer to calculate one or more 1-st losses by referring to the regression location information for training and its corresponding at least one ROI Ground-Truth (GT), and learning the regressor via backpropagation using the 1-st losses such that the 1-st losses are minimized, a testing device, if at least one parking lot image for testing is acquired which is created by taking a shot of a nearby area of a vehicle for testing from an upper part of a parking lot for testing toward a ground of the parking lot for testing, performing (a-1) a process of inputting the parking lot image for testing into the segmentation network, to thereby allow the segmentation network to (a-1-a) output at least one convolution feature map for testing by applying the convolution operation to the parking lot image for testing via the encoder, (a-1-b) output at least one deconvolution feature map for testing by applying the deconvolution operation to the convolution feature map for testing via the decoder, and (a-1-c) output segmentation information for testing, representing segmentation of one or more unoccupied parking regions for testing on the parking lot image for testing, by applying the masking operation to the deconvolution feature map for testing via the masking layer; and (b) the testing device performing (i) a process of inputting the deconvolution feature map for testing, corresponding to a specific ROI for testing, into the regressor, to thereby allow the regressor (i-1) to generate relative coordinates for testing of one or more vertices of the specific ROI for testing from a center of the specific ROI for testing, and thus (i-2) to generate regression location information for testing on at least one specific available parking region for testing by applying the regression operation to the relative coordinates for testing, wherein the specific available parking region for testing among the unoccupied parking regions for testing is determined as the specific ROI for testing.

9. The method of claim 8, wherein the segmentation network has been pre-learned to output segmentation information for testing created by segmenting the unoccupied parking regions for testing on the parking lot image for testing by a previous learning device, and wherein, if at least one previous parking lot image for training is acquired, the previous learning device performs (i) a process of inputting the previous parking lot image for training into the segmentation network, to thereby allow the segmentation network to (i-1) output at least one previous convolution feature map for training by applying at least one convolution operation to the previous parking lot image for training via the encoder, (i-2) output at least one previous deconvolution feature map for training by applying at least one deconvolution operation to the previous convolution feature map for training via the decoder, and (i-3) output previous segmentation information for training, representing segmentation of the unoccupied parking regions on the previous parking lot image for training, by applying at least one masking operation to the previous deconvolution feature map for training via the masking layer, and (ii) a process of instructing a 2-nd loss layer to calculate one or more 2-nd losses by referring to the previous segmentation information for training and its corresponding at least one segmentation GT, and updating at least one parameter of the masking layer, the decoder, and the encoder via backpropagation using the 2-nd losses such that the 2-nd losses are minimized.

10. The method of claim 8, wherein the testing device performs a process of instructing the masking layer to apply at least one masking operation to the deconvolution feature map for testing, to thereby segment at least one of (i) one or more available parking regions of interest for testing, (ii) one or more background regions for testing, (iii) one or more available parking regions of no interest for testing, and (iv) one or more occupied parking regions for testing, on the parking lot image for testing.

11. The method of claim 10, wherein the testing device performs a process of instructing the masking layer to segment the unoccupied parking regions for testing into the available parking regions of interest for testing and the available parking regions of no interest for testing by referring to one or more distances between the unoccupied parking regions for testing and the vehicle for testing.

12. The method of claim 8, further comprising a step of:

(c) if the regression location information for testing on the specific available parking region for testing is acquired, the testing device performing a process of instructing the automatic parking device of the vehicle for testing to park the vehicle for testing in the specific available parking region for testing by referring to the regression location information for testing.

13. A learning device for learning an automatic parking device of a vehicle to be used for detecting an available parking area in a parking lot, comprising:

at least one memory that stores instructions; and at least one processor configured to execute the instructions to perform or support another device to perform: (I) if at least one parking lot image is acquired which is created by taking a shot of a nearby area of the vehicle from an upper part of the parking lot toward a ground of the parking lot, (i) a process of inputting the parking lot image into a segmentation network, to thereby allow the segmentation network to (i-1) output at least one convolution feature map by applying at least one convolution operation to the parking lot image via an encoder, (i-2) output at least one deconvolution feature map by applying at least one deconvolution operation to the convolution feature map via a decoder, and (i-3) output segmentation information, representing segmentation of one or more unoccupied parking regions on the parking lot image, by applying at least one masking operation to the deconvolution feature map via a masking layer, (II) a process of inputting the deconvolution feature map, corresponding to a specific Region of Interests (ROI), into a regressor to thereby allow the regressor (i-1) to generate relative coordinates of one or more vertices of the specific ROI from a center of the specific ROI, and thus (i-2) to generate regression location information on at least one specific available parking region by applying at least one regression operation to the relative coordinates, wherein the specific available parking region among the unoccupied parking regions is determined as the specific ROI, and (III) a process of instructing a 1-st loss layer to calculate one or more 1-st losses by referring to the regression location information and its corresponding at least one ROI Ground-Truth (GT), and a process of learning the regressor via backpropagation using the 1-st losses such that the 1-st losses are minimized.

14. The learning device of claim 13, wherein the segmentation network has been pre-learned to output segmentation information created by segmenting the unoccupied parking regions on the parking lot image by a previous learning device, and wherein, if at least one previous parking lot image for training is acquired, the previous learning device performs (i) a process of inputting the previous parking lot image for training into the segmentation network, to thereby allow the segmentation network to (i-1) output at least one previous convolution feature map for training by applying at least one convolution operation to the previous parking lot image for training via the encoder, (i-2) output at least one previous deconvolution feature map for training by applying at least one deconvolution operation to the previous convolution feature map for training via the decoder, and (i-3) output previous segmentation information for training, representing segmentation of the unoccupied parking regions on the previous parking lot image for training, by applying at least one masking operation to the previous deconvolution feature map for training via the masking layer, and (ii) a process of instructing a 2-nd loss layer to calculate one or more 2-nd losses by referring to the previous segmentation information for training and its corresponding at least one segmentation GT, and updating at least one parameter of the masking layer, the decoder, and the encoder via backpropagation using the 2-nd losses such that the 2-nd losses are minimized.

15. The learning device of claim 13, wherein the processor performs a process of jittering the ROI GT, and a process of instructing the 1-st loss layer to calculate the 1-st losses by referring to the jittered ROI GT and the regression location information.

16. The learning device of claim 15, wherein the processor performs a process of setting a maximum and a minimum of scales of the ROI GT by referring to the scales of the ROI GT, and a process of jittering the ROI GT by using an average of the maximum and the minimum of the scales of the ROI GT.

17. The learning device of claim 16, wherein the processor performs a process of acquiring one or more random scales which are selected randomly from between the maximum and the minimum of the scales, and a process of instructing the 1-st loss layer to calculate one or more 3-rd losses by referring to each of the random scales and the regression location information, and fine-tune the regressor via backpropagation using each of the 3-rd losses such that each of the 3-rd losses is minimized.

18. The learning device of claim 13, wherein the processor performs a process of instructing the masking layer to apply at least one masking operation to the deconvolution feature map, to thereby segment at least one of (i) one or more available parking regions of interest, (ii) one or more background regions, (iii) one or more available parking regions of no interest, and (iv) one or more occupied parking regions, on the parking lot image.

19. The learning device of claim 18, wherein the processor performs a process of instructing the masking layer to segment the unoccupied parking regions into the available parking regions of interest and the available parking regions of no interest by referring to one or more distances between the unoccupied parking regions and the vehicle.

20. A testing device for testing an automatic parking device of a vehicle to be used for detecting an available parking area in a parking lot, comprising:
at least one memory that stores instructions; and
at least one processor configured to execute the instructions to perform or support another device to perform: (I) on condition that a learning device has performed, if at least one parking lot image for training is acquired, (i) a process of inputting the parking lot image for training into a segmentation network, to thereby allow the segmentation network to (i-1) output at least one convolution feature map for training by applying at least one convolution operation to the parking lot image for training via an encoder, (i-2) output at least one deconvolution feature map for training by applying at least one deconvolution operation to the convolution feature map for training via a decoder, and (i-3) output segmentation information for training, representing segmentation of one or more unoccupied parking regions for training on the parking lot image for training, by applying at least one masking operation to the deconvolution feature map for training via a masking layer, (ii) a process of inputting the deconvolution feature map for training, corresponding to a specific Region of Interests (ROI) for training, into a regressor to thereby allow the regressor (ii-1) to generate relative coordinates for training of one or more vertices of the specific ROI for training from a center of the specific ROI for training, and thus (ii-2) to generate regression location information for training on at least one specific available parking region for training by applying at least one regression operation to the relative coordinates for training, wherein the specific available parking region for training among the unoccupied parking regions for training is determined as the specific ROI for training, and (iii) a process of instructing a 1-st loss layer to calculate one or more 1-st losses by referring to the regression location information for training and its corresponding at least one ROI Ground-Truth (GT), and learning the regressor via backpropagation using the 1-st losses such that the 1-st losses are minimized, (I-1) if at least one parking lot image for testing is acquired which is created by taking a shot of a nearby area of a vehicle for testing from an upper part of a parking lot for testing toward a ground of the parking lot for testing, a process of inputting the parking lot image for testing into the segmentation network, to thereby allow the segmentation network (I-1-a) to output at least one convolution feature map for testing by applying the convolution operation to the parking lot image for testing via the encoder, (I-1-b) output at least one deconvolution feature map for testing by applying the deconvolution operation to the convolution feature map for testing via the decoder, and (I-1-c) output segmentation information for testing, representing segmentation of one or more unoccupied parking regions for testing on the parking lot image for testing, by applying the masking operation to the deconvolution feature map for testing via the masking layer, and (II) a process of inputting the deconvolution feature map for testing, corresponding to a specific ROI for testing, into the regressor, to thereby allow the regressor (II-1) to generate relative coordinates for testing of one or more vertices of the specific ROI for testing from a center of the specific ROI for testing, and thus (II-2) to generate regression location information for testing on at least one specific available parking region for testing by applying the regression operation to the relative coordinates for testing, wherein the specific available parking region for testing among the unoccupied parking regions for testing is determined as the specific ROI for testing.

21. The testing device of claim 20, wherein the segmentation network has been pre-learned to output segmentation information for testing created by segmenting the unoccupied parking regions for testing on the parking lot image for testing by a previous learning device, and
wherein, if at least one previous parking lot image for training is acquired, the previous learning device performs (i) a process of inputting the previous parking lot image for training into the segmentation network, to thereby allow the segmentation network to (i-1) output at least one previous convolution feature map for training by applying at least one convolution operation to the previous parking lot image for training via the encoder, (i-2) output at least one previous deconvolution feature map for training by applying at least one deconvolution operation to the previous convolution feature map for training via the decoder, and (i-3) output previous segmentation information for training, representing segmentation of the unoccupied parking regions on the previous parking lot image for training, by applying at least one masking operation to the previous deconvolution feature map for training via the masking layer, and (ii) a process of instructing a 2-nd loss layer to calculate one or more 2-nd losses by referring to the previous segmentation information for training and its corresponding at least one segmentation GT, and updating at least one parameter of the masking layer, the decoder, and the encoder via backpropagation using the 2-nd losses such that the 2-nd losses are minimized.

22. The testing device of claim 20, wherein the processor performs a process of instructing the masking layer to apply at least one masking operation to the deconvolution feature map for testing, to thereby segment at least one of (i) one or more available parking regions of interest for testing, (ii) one or more background regions for testing, (iii) one or more available parking regions of no interest for testing, and (iv) one or more occupied parking regions for testing, on the parking lot image for testing.

23. The testing device of claim 22, wherein the processor performs a process of instructing the masking layer to segment the unoccupied parking regions for testing into the available parking regions of interest for testing and the available parking regions of no interest for testing by referring to one or more distances between the unoccupied parking regions for testing and the vehicle for testing.

24. The testing device of claim 20, wherein the processor further performs:
(III) if the regression location information for testing on the specific available parking region for testing is acquired, a process of instructing the automatic parking device of the vehicle for testing to park the vehicle for testing in the specific available parking region for testing by referring to the regression location information for testing.

* * * * *